United States Patent [19]

Sovia et al.

[11] 3,923,338

[45] Dec. 2, 1975

[54] WINDSHIELD FOR SNOW VEHICLE

[76] Inventors: Cedric C. Sovia, 319 S. Lake St., Forest Lake, Minn. 55025; Kenneth W. Krengel, 1800 Highland Parkway, St. Paul, Minn. 55116

[22] Filed: May 15, 1974

[21] Appl. No.: 470,072

[52] U.S. Cl.................................. 296/84 K; 296/90
[51] Int. Cl.² ............................................. B60J 1/02
[58] Field of Search...... 280/18; 180/5 R; 296/78 R, 296/84 R, 84 K, 90; 9/1 R

[56] References Cited
UNITED STATES PATENTS

| | | | |
|---|---|---|---|
| 3,680,882 | 8/1972 | Fleury | 180/5 R X |
| 3,819,226 | 6/1974 | Sykora | 180/5 R X |

Primary Examiner—Leo Friaglia
Assistant Examiner—Michael J. Forman

[57] ABSTRACT

A windshield is provided for use on toboggans, sleds, skimobiles and the like, preferable those provided with a rounded front end. The windshield is formed of a flexible sheet of crack resistant transparent sheet material. The windshield is somewhat crescent shaped in form when flat having a general convex edge and a generally concave edge. The convex edge is secured to the rounded front edge of the vehicle and the concave upper surface forms the upper edge, the windshield sloping upwardly and inwardly or rearwardly. The lower convex edge is notched at intervals to receive fastening means capable of releasing when the windshield is struck.

5 Claims, 4 Drawing Figures

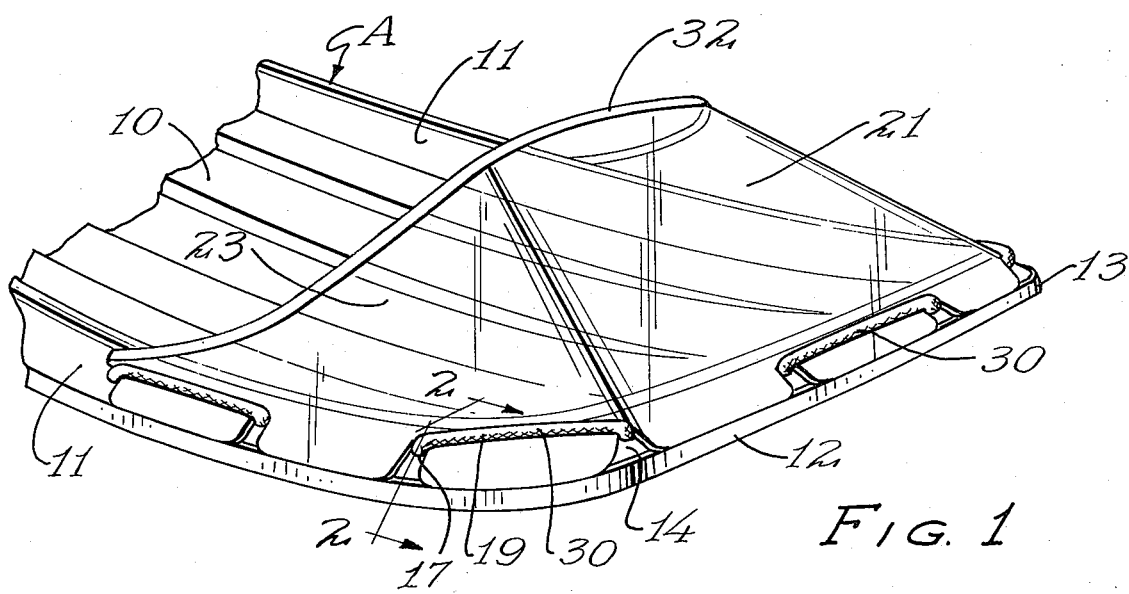
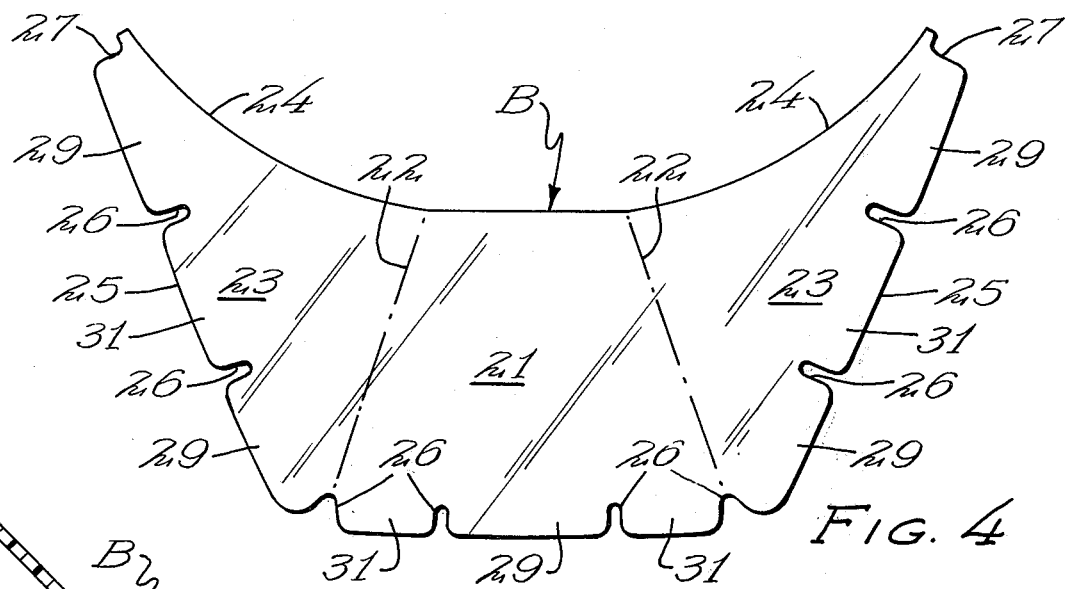
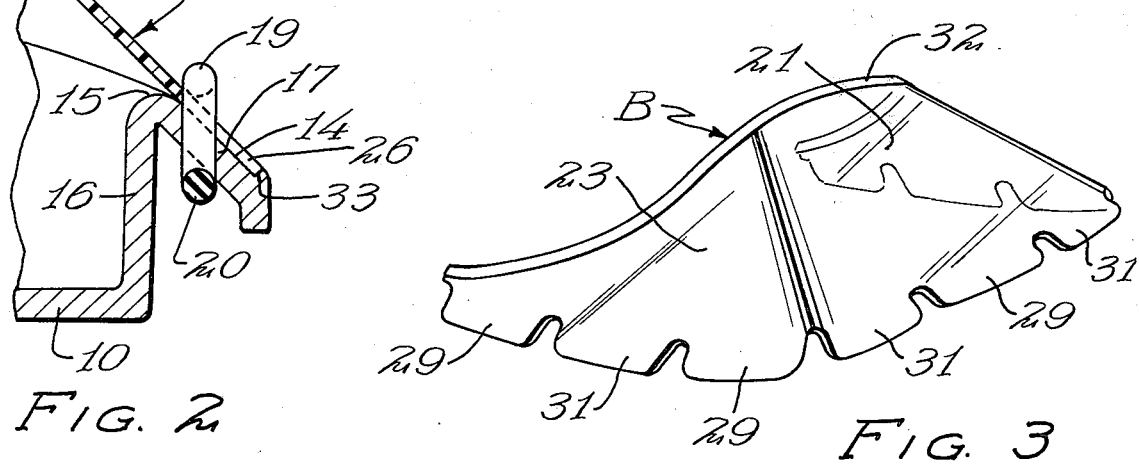

WINDSHIELD FOR SNOW VEHICLE

This invention relates to an improvement in vehicle windshield and deals particularly with a windshield designed for use with toboggan, sled, skimobile or other such vehicle.

BACKGROUND OF THE INVENTION

Toboggans and vehicles of this type are normally used in conditions where the riders are likely to be covered with snow. For example, when traveling down hill on a toboggan, the snow and wind caused by the motion of the vehicle often makes it difficult for the driver to see. This can cause serious accidents both to the passengers and to bystanders. When the driver of the vehicle cannot see properly, he is likely to guide the vehicle into a tree, another vehicle, or a bystander. Such a collision is very likely to cause serious injury to the passengers, as well as to the vehicle and to the person struck.

I have found that much of the difficulty may be avoided by providing a wind deflector or windshield on the rounded forward end of the vehicle. This windshield may protect the eyes of the vehicle operator in the event the driver is in a prone position. The windshield may be high enough to extend forwardly of the occupant. However, for the most part, the windshield is designed to deflect air in an upward direction, decreasing the force of the wind caused by movement of the vehicle, and deflecting air and snow upwardly over the vehicle occupants.

SUMMARY OF THE INVENTION

The present invention resides in the provision of a windshield formed of flexible resilient plastic sheeting or the like which is normally flat, and which may be die cut from a sheet of the plastic material. While the windshield may be mounted to extend vertically from the forward edge of the vehicle, in preferred form, the vehicle is provided with an upwardly and inwardly inclined forward surface to which the windshield is secured. Windshield securing means are provided on the body of the vehicle, and the windshield is secured to this fastening means, after flexing the windshield into the proper position.

A Further feature of the present invention resides in the provision of a windshield of the type described which is held in place by the flexibility of the windshield, and the tendency for the windshield to attain its normal flat configuration. When the windshield is attached to the vehicle, it must be flexed into curved form to fit the shape of the rounded forward end of the vehicle. As a result, the windshield tends to flatten out, creating an outward force on the fastening means which holds the windshield in its proper position.

A further feature of the present invention resides in the provision of a windshield which is somewhat crescent shaped in form. The convex lower surface of the windshield is notched at spaced points, the notches extending into the windshield body at substantially right angles to the convex edge. When bent into curved form, the notches engage the fastening means on the vehicle, holding the windshield from returning to its normal flat form. The tendency of the windshield to assume its flat form causes the fastening means to engage the windshield adjoining the notches, maintaining the windshield in its proper position. The upper concave edge of the windshield forms the upper edge of the windshield.

A feature of the present invention resides in the fact that the windshield may be detached from the vehicle, upon striking an obstacle, preventing the windshield from breaking and injuring the rider.

A feature of the present invention resides in the fact that the windshield may be held in place by a cord attached to the inclined forward rounded edge of the vehicle. By providing spaced holes in the rounded outwardly inclined forward edge of the vehicle, a rope may be wound in and out of the spaced holes so that alternate portions of the rope lie against the upper and outer surfaces of the portion of the vehicle to which the cord is attached. The portions of the windshield between the spaced notches form tongues which may extend between the cord and the body of the vehicle to hold the windshield in place.

A further feature of the present invention resides in the fact that the upper edge of the windshield may be enclosed by a protective covering of channel-shaped cross sections which may be frictionally engaged on the windshield. This is designed to prevent the edges of the windshield from causing any injury to the rider.

These and other objects and novel features of the present invention will be more clearly and fully set forth in the following specification and claims.

BRIEF DESCRIPTION OF THE DRAWINGS

FIG. 1 is a perspective view of the front end of a sled or similar vehicle, showing my new construction.

FIG. 2 is a sectional view through a detail portion of the device, the positions of the section being shown by the line 2—2 of FIG. 1.

FIG. 3 is a perspective view of the bent windshield detached from the vehicle.

FIG. 4 is a diagrammatic plan view of the windshield in flat form.

DESCRIPTION OF THE PREFERRED EMBODIMENTS

The toboggan type device which is used with the windshield is indicated by the letter A in FIG. 1 of the drawings. The device composes an elongated body, the lower surface of which is designed to rest upon the snow and which is slightly concave on its upper surface. The stepped bottom of the device is indicated by the numeral 10, and the sides of the device are indicated by the numeral 11. The forward end 12 of the toboggan inclines upwardly as indicated in FIG. 1 and is somewhat rounded as indicated at 13. A flange 14 which is best shown in FIG. 2 of the drawings inclines outwardly and downwardly from the upper edge 15 of the front wall 16, and is provided with spaced apertures 17 to accommodate a flexible rope 19 which is sometimes described as a "Bungee" cord and which is laced through the apertures 17 to extend above the flange 14 between the remaining apertures as indicated at 20. In other words, the rope is laced up and down through the apertures 17, one half of the rope 19 extending over the upper surface of the flange 14 and the remainder of the rope extending beneath the flange as indicated in FIG. 1 of the drawings.

The windshield B is best shown in its flat form in FIG. 4 of the drawings. The windshield B is somewhat crescent shaped in form including a center portion which is generally trapezoidal in outline and which is indicated by the numeral 21. The broken line 22 which defines the opposite sides of the trapezoidal portion 21 have been inserted merely for the purpose of the illustration to show the center portion of the bend between the center portion 21 of the windshield and the sides 23 thereof which are of generally triangular shape.

The side portions 23 are defined along their upper edge by a curved line 24 and along their lower edge by a generally straight line 25. The lower edge of the windshield B is provided with notches 26, such notches extending into the center portion 21 of the windshield, two of the notches extending into the windshield at the mythical junction between the center portion 21 and the side portions 23, and two of the notches extending into the lower edges 25 of the side portions 23. A half notch 27 extends into each side portion 23, the purpose of each half notch 27 being to hold the windshield in place near the rear ends of the windshield.

The windshield B is preferably formed of transparent tough plastic which is sufficiently flexible to permit the windshield to be flexed into the position indicated in FIG. 3 of the drawings. In general, the side portions 23 are folded into generally right angular relation to the center portion 21. The lower edge of the windshield is divided into flexible fingers 29 or tongues which overlie the flange 14 and are inserted between the portions 30 of the rope or cord 19, and alternate similar tongues 31 which overlie the flange 14 between the exposed portions of the rope 19.

A protective edge 32 extends throughout the length of the upper edge of the windshield. While note shown in detail, the protective edge 32 comprises an elongated strip or rubber, plastic or the like. On longitudinal edge of the protective strip 32 is bifurcated to accommodate the edge of the windshield, and to reduce the chance of injury to the occupant of the sled in the event the windshield becomes detached and moves rearwardly against the occupant.

The purpose of the windshield B is to deflect snow upwardly and rearwardly as the sled moves along the surface of the snow. Furthermore, the windshield enhances the appearance of the device. As will be shown in FIG. 2 of the drawings, the lower edge 25 of the windshield is held in place by a shoulder 33 formed in the upper surface of the flange 14 near the lower edge of the flange. This shoulder 33 tends to properly locate the windshield which is necessary when a flexible means such as rope is used to hold the windshield in place. As will be noted in FIG. 2 of the drawings, the holes 17 preferably extend vertically through the inclined flange 14, and as a result the rope tends to exert a slight downward force on the windshield tending to hold the lower edge of the windshield against the shoulder 33.

The general idea of providing a windshield of the type in question is to protect the occupant against the direct force of snow in the event the front of the sled dips into a snow bank or the like or otherwise extends beneath the level of the snow. It is important the windshield be completely unbreakable and formed of a slightly resilient material so that the windshield can flex rather than to break in the event it strikes an obstacle. The idea of forming the windshield in the manner described is to permit the windshield to become detached from the sled in the event it strikes such an obstacle. In the event the windshield becomes detached, it quickly assumes its flat form, however, it may be easily reinserted by flexing the windshield and inserting the tongues 29 back beneath the exposed portions of the rope 19.

While the windshield B has been described for use in conjunction with a sled type vehicle of the type described having an inclined encircling flange 14, it may be used on other forms of vehicles, particularly those which have a marginal flange of the type disclosed. Which it is also possible for the windshield to be used in conjunction with edges which extend vertically, such an arrangement is less desirable as the windshield would not become detached as easily. The windshield is very easy to attach and detach, and is produced at a minimum of cost because it may be stamped out from sheet stock while in its normal flat form.

In accordance with the Patent Statutes, I have described the principles of construction and operation of my invention in VEHICLE WINDSHIELD; and while I have endeavored to set forth the best embodiment, I desire to have it understood that obvious changes may be made within the scope of the following claims without departing from the spirit of my invention.

We claim:

1. A snow vehicle including:
   an elongated vehicle body having a rounded forward end,
   a flange secured to said rounded forward end and extending downwardly therefrom,
   said flange having spaced apertures therethrough,
   a flexible cord laced back and forth through said apertures to provide spaced portions of said cord lying outwardly of said flange,
   a windshield of flexible transparent material having a lower edge provided with notches spaced generally similarly to said apertures in said flange,
   portions of said lower edge of said windshield between said notches engaging between said cord and said flange.

2. The structure of claim 1 and in which said elongated vehicle body includes a somewhat concave upper surface.

3. The structure of claim 1 and in which said lower windshield edge includes a substantially straight center portion, and opposite generally straight side portions on opposite sides of said center portion.

4. A windshield for use with a vehicle having
   an elongated body provided with a rounded forward end, the windshield comprising;
   a flexible normally flat transparent plastic windshield
   said windshield having a generally crescent shaped body including a convex edge and a shorter generally shaped concave edge,
   spaced open edge notches extending into said body of said windshield from said convex edge thereof and generally normal thereto,
   spaced means on said rounded forward edge of said vehicle body engageable into said notches when said windshield is flexed into a curved shape,
   a downwardly and outwardly inclined curved flange along said rounded forward edge of said vehicle body,
   spaced apertures in said flange spaced from the edges thereof,
   a flexible cord threaded through said apertures to provide spaced portions overlying the upper and outer surfaces of said flange, said cord overlying spaced portions of said windshield between said notches and forming said spaced means on said rounded forward end.

5. The structure of claim 4 and in which said windshield includes projecting tongues between said notches, said tongues extending between the outer surface of said flange and said cord.

* * * * *